(12) United States Patent
Althaus et al.

(10) Patent No.: US 7,900,455 B2
(45) Date of Patent: Mar. 8, 2011

(54) METHOD FOR THE OPERATION OF A PRESSURE ACCUMULATOR PLANT, AND PRESSURE ACCUMULATOR PLANT

(75) Inventors: Rolf Althaus, Herrliberg (CH); Markus Gruenenfelder, Ennetbaden (CH); Christian Henssler, Siglisdorf (CH); Patrik Alfons Meier, Baden (CH); Hans-Juergen Peters, Waldshut-Tiengen (DE); Urs Zinniker, Oberrohrdorf (CH)

(73) Assignee: Alstom Technology Ltd, Baden (CH)

( * ) Notice: Subject to any disclaimer, the term of this patent is extended or adjusted under 35 U.S.C. 154(b) by 675 days.

(21) Appl. No.: 11/812,903

(22) Filed: Jun. 22, 2007

(65) Prior Publication Data
US 2008/0000233 A1    Jan. 3, 2008

Related U.S. Application Data

(63) Continuation of application No. PCT/EP2005/056172, filed on Nov. 23, 2005.

(30) Foreign Application Priority Data

Dec. 23, 2004 (CH) ........................ 2136/04
Feb. 23, 2005 (CH) ........................ 0324/05

(51) Int. Cl.
    *F02C 6/00* (2006.01)
(52) U.S. Cl. ........................ 60/727; 60/39.183
(58) Field of Classification Search ........... 60/772, 60/727, 39.183, 682, 683, 684, 39.511, 794
    See application file for complete search history.

(56) References Cited

U.S. PATENT DOCUMENTS

| 3,631,673 A | 1/1972 | Charrier et al. |
| 3,831,373 A | 8/1974 | Flynt |
| 4,043,120 A | 8/1977 | Hoffeins |
| 4,523,432 A * | 6/1985 | Frutschi ................ 60/659 |

(Continued)

FOREIGN PATENT DOCUMENTS

DE    23 26 145 A1    12/1973

(Continued)

OTHER PUBLICATIONS

International Search Report dated Jun. 23, 2005.

(Continued)

*Primary Examiner* — Michael Cuff
*Assistant Examiner* — Vikansha S Dwivedi
(74) *Attorney, Agent, or Firm* — Buchanan Ingersoll & Rooney PC (57) ABSTRACT

A recuperative air storage plant comprising a gas turbine set and a heat exchanger. In the heat exchanger, exhaust gas heat from the gas turbine set can be transferred to a pressurized stored fluid which flows from a storage volume to a expansion machine. A flow junction with an exhaust gas damper which can be operated in a plurality of positions is arranged in the exhaust gas path of the gas turbine set, upstream of the heat exchanger. This exhaust gas damper makes it possible to divide the exhaust gas mass flow ($m_0$) of the gas turbine set in a variable fashion between a stack and the heat exchanger. In this way it is possible to operate the gas turbine set quickly at high power in the electric power network independently of the heat exchanger and the expansion machine, while the thermal load of the air storage part is slowly increased by incrementally increasing the exhaust gas proportion ($m_1$) which flows to the heat exchanger.

21 Claims, 3 Drawing Sheets

U.S. PATENT DOCUMENTS

| | | | | |
|---|---|---|---|---|
| 4,630,436 | A | * | 12/1986 | Frutschi ..................... 60/39.183 |
| 5,379,589 | A | * | 1/1995 | Cohn et al. ................... 60/39.59 |
| 5,495,709 | A | * | 3/1996 | Frutschi ....................... 60/39.55 |
| 5,537,822 | A | | 7/1996 | Shnaid et al. |
| 5,778,675 | A | * | 7/1998 | Nakhamkin .................... 60/652 |
| 6,276,123 | B1 | | 8/2001 | Chen et al. |
| 2003/0033810 | A1 | | 2/2003 | Kreitmeier |
| 2003/0033814 | A1 | | 2/2003 | Bakran et al. |

FOREIGN PATENT DOCUMENTS

| | | |
|---|---|---|
| DE | 22 63 051 A1 | 7/1974 |
| DE | 25 38 756 A1 | 3/1977 |
| DE | 34 11 444 A1 | 8/1985 |
| DE | 44 10 440 A1 | 8/1995 |
| DE | 103 14 041 A1 | 12/2004 |
| EP | 1 512 855 A | 3/2005 |
| FR | 2 224 642 A | 10/1974 |

OTHER PUBLICATIONS

International Search Report for PCT/EP2005/056172.

* cited by examiner

METHOD FOR THE OPERATION OF A PRESSURE ACCUMULATOR PLANT, AND PRESSURE ACCUMULATOR PLANT

RELATED APPLICATIONS

This application claims priority under 35 U.S.C. §119 to Swiss Application 02136/04 filed in Switzerland on Dec. 23, 2004; Swiss Application 00324/05 filed in Switzerland on Feb. 23, 2005; and as a continuation application under 35 U.S.C. §120 to PCT/EP2005/056172 filed as an International Application on Nov. 23, 2005, designating the U.S., the entire contents of which are hereby incorporated by reference in their entireties.

TECHNICAL FIELD

The invention relates to a method for operating a pressure accumulator plant. It also relates to a pressure accumulator plant which is suitable for carrying out the method according to the invention. Furthermore, a control unit is specified which is correspondingly suitable and configured to cause a pressure accumulator plant to carry out a method according to the invention, a digital code which is suitable for correspondingly configuring the control unit and a data carrier on which the code is stored in an executable form and/or as a source code.

BACKGROUND INFORMATION

Pressure accumulator plants in which a pressurized stored fluid, in particular air, is stored in a storage volume and when necessary is expanded with the outputting of power in a expansion machine have become known from the prior art. U.S. Pat. No. 5,537,822 has disclosed a pressure accumulator plant in which the stored fluid is heated in a heat exchanger before being expanded. In an embodiment disclosed in said document, exhaust gas from a gas turbine set flows through the heat exchanger on the heat-emitting side. Such a recuperative embodiment of a pressure accumulator plant utilizes the waste heat from the gas turbine set very efficiently. Owing to the indirect heating of the stored fluid, said fluid is not contaminated by aggressive flue gas components. For this reason, for example a derivative of a standard steam turbine, which is only slightly modified, can be used as expansion machine in a highly economical way. In the fixed operating mode of the pressure accumulator plant, such a machine is adapted in the best possible way to the thermal peripheral conditions. However, when the plant starts, there are limits on the temperature gradients which can be implemented in a steam turbine, and this must be allowed for in the starting phase. In an arrangement such as is disclosed in U.S. Pat. No. 5,537,822, for example the gas turbine set must be correspondingly operated over a relatively long time period in accordance with an operating regime which is predefined by the expansion machine, and can therefore only be loaded very slowly, which per se contradicts the operating regime of a gas turbine set, and it is possible to react freely to the power requirements of the electric power network only after a long delay, in order to ensure that the possibility of utilizing waste heat in the expansion machine is capable of coping with the waste heat supply made available by the gas turbine set and the stored fluid expansion machine is not damaged by excessively fast starting up and loading.

SUMMARY

A method of the type mentioned at the beginning which is suitable for starting a pressure accumulator plant, in particular a recuperative pressure accumulator plant such as has been described above, and which, in accordance with one aspect of many aspects of the present invention, avoids the disadvantages of the prior art will now be specified. More specifically, the method is intended to permit the pressure accumulator plant to be introduced into an electric power network as quickly as possible and with the highest possible power gradient without overburdening the fast starting capability of the expansion machine, which could drastically shorten its service life. At the same time, according to a further aspect of the invention, the stored fluid which is necessary at most to ensure the operation of the heat exchanger during the starting phase is to be utilized as efficiently as possible.

The method as described and the exemplary pressure accumulator plant cam meet these requirements, alongside further advantages.

According to the disclosed method, the temperature of the stored fluid which is made available for the expansion machine is controlled in a suitable way independently of the power output of the gas turbine set. Since the temperature of the stored fluid and the power output of the gas turbine set are decoupled from one another, the gas turbine set can be loaded with its normal power gradient. In this context, after synchronization, a gas turbine set can be loaded to maximum power within, for example, 20 to 30 minutes; machines which are provided for covering peak loads reach even significantly shorter loading times in this context, and these may even be in the range from 5 to 10 minutes.

In one development of the method, the expansion machine does not have a stored fluid mass flow fed to it until the temperature of the stored fluid at the outlet from the heat exchanger has reached a minimum value. This criterion is significant especially if the heat exchanger must first reach an operating temperature starting from a cold state. In one embodiment, the minimum value of the stored fluid temperature is determined as a function of an average temperature of the rotor of the expansion machine. This avoids, inter alia, a sudden ingress of cold air into the expansion machine with an associated thermal shock. In one development, this is the case as early as possible after the synchronization of the gas turbine set, for example directly after the synchronization of the gas turbine set. By early application of stored fluid to the expansion machine the latter is of course placed as quickly as possible in a state which is ready for loading. Important parameters for a steam turbine which is used as a expansion machine are, for example, the temperature of the rotor, the uniformity of the heating of the rotor and the distribution of the temperature in the rotor and/or the speed of heating at the inlet flange of the machine as well as the temperature at the outlet from the turbine during the starting process at low rotational speeds. Controlling the temperature of the stored fluid which is made available for the expansion machine makes it in principle possible to direct stored fluid into the expansion machine even at a very early time.

One embodiment of the method provides for the temperature of the stored fluid which is made available for the expansion machine to be controlled in such a way that the temperature and/or the temperature gradient of the expanded stored fluid and/or the temperature gradient of the rotor temperature and/or the housing temperature at the outlet of the expansion machine remain below a limiting value, or do not exceed the limiting value. This is advantageous at low rotational speeds and at low power levels of the expansion machine, in particular in the case of an air turbine. At low rotational speeds of a turbine, that is to say in particular during the starting and acceleration processes, for reasons of stage kinematics the mass flow specific enthalpy conversion of the working fluid is low, for which reason the temperature difference between the inlet and outlet of the turbine is low. That is to say the fluid temperature at the outlet is comparatively near to the fluid temperature at the inlet, for which reason, for example, thermal overloading of the outlet region which is configured for low temperatures is possible unless suitable measures are taken. This means that the temperature of the working fluid at the machine inlet can be increased only slowly with the rotational speed of the machine when acceleration occurs, and this slows down the acceleration process. A development of the method which is explained below provides that during the starting and acceleration of the expansion machine the generator which is coupled to the expansion machine is at least at times operated as electric motor, thus supporting the acceleration process. Compared to the acceleration of an air turbine which is customary according to the prior art in which the turbine is accelerated purely by the flowing working fluid, significantly faster acceleration of the expansion machine and thus a faster increase in the temperature of the inflowing working fluid is thus achieved, and associated with this ultimately an earlier output of power by the expansion machine into the electric power network is made possible. Similar problems arise in the case of low power of an air turbine which is operated as a expansion machine. The low mass flow results in a low pressure ratio and thus a comparatively low reduction in enthalpy and temperature, for which reason the temperature at the outlet of the turbine is close to the inlet temperature compared to the full load operating mode even at a rated rotational speed but low power of an air turbine. There is thus the potential risk of overheating at the turbine outlet even at the rated rotational speed and in the idling mode or at low power. Therefore, it is advantageous if when accelerating an air turbine to the rated rotational speed and when loading at power levels below the full load power, and in particular below 10% or 25% to 50% of the full load power, the temperature of the stored fluid which flows in to the expansion machine is controlled in such a way that specific temperatures and/or temperature gradients at the outlet of the expansion machine are not exceeded. In this context it is possible, on the one hand, to determine the temperature at the outlet as a function of the temperature at the inlet or the temperature at the inlet as a function of the temperature at the outlet and also as a function of the pressure ratio across the expansion machine and/or as a function of the power and/or the rotational speed of the expansion machine.

In the configuration of the method it proves expedient, but not absolutely necessary, to speed up further the starting process and the power output of the entire power plant by assisting the starting up of the expansion machine by means of the motor mode of a generator which is assigned to the expansion machine. Since the power of the electric machine is additionally available to increase the rotational speed of the expansion machine, its rotational speed can be increased more quickly, as a result of which the temperature of the stored fluid at the inlet into the expansion machine can be increased more quickly without exceeding permissible temperatures and/or temperature gradients at the outlet of the expansion machine. This is due to the fact that, as described above, a relatively high mass flow specific reduction in enthalpy takes place at a relatively high rotational speed in such a way that the drop in temperature of the stored fluid as it flows through the expansion machine progressively increases as the rotational speed rises. It is thus possible to accelerate and to synchronize the expansion machine more quickly to the rotational speed which is synchronous with the power network, and the expansion machine can be heated more quickly and placed in its operationally ready state.

Furthermore, with the relatively high rotational speed of the expansion machine, its absorption capacity also increases and it is possible for the expansion machine to absorb and utilize a relatively high mass flow of heated stored fluid. Overall, the forced starting of the expansion machine by means of the motor-operated generator contributes to fast and energy-efficient starting of the pressure accumulator plant in a way which is at the same time gentler and extends the service life.

In one embodiment of the method, the temperature of the stored fluid is already controlled at the outlet from the heat exchanger. This can of course be done by correspondingly adapting the mass flow of stored fluid flowing through the heat exchanger. If the expansion machine is not capable of handling this mass flow in its current operating state, according to one embodiment of the method described here a partial mass flow which exceeds the mass flow which can be utilized by the expansion machine is blown off or cooled again and compressed back into the storage volume. To do this, a branch line whose flow cross section can be varied and/or shut off and released by means of an actuator element and/or shutoff element branches off from the flow path which leads from the heat exchanger to the expansion machine. However, at the same time, a partial mass flow of the stored fluid is discarded unused. One development of the method provides for the input of heat into the heat exchanger to be varied in order to control the temperature of the stored fluid at the outlet from the heat exchanger. In one development, this is done by feeding a variable proportion of the exhaust gas mass flow of the gas turbine set to the heat exchanger. In order to implement this, an exemplary pressure accumulator plant which is suitable for carrying out the method comprises a flow junction which is arranged downstream of the gas turbine set and upstream of the heat exchanger with an adjustable damper arranged therein in order to deflect the flow and in order to divide the flow in a variable fashion, which flow junction is arranged in such a way that variable proportions of the exhaust gas mass flow of the gas turbine set can be directed to the heat exchanger and to a second branch of the junction. In one specific embodiment of the pressure accumulator plant, the damper is embodied in such a way that it has a first fixed operating position in which the entire exhaust gas mass flow is directed into the heat exchanger; and in addition the damper has a second fixed operating position in which the entire exhaust gas mass flow is directed into the second branch. In order to carry out the method, the damper also has at least a third fixed operating position in which a first partial flow of the exhaust gas is directed to the heat exchanger and a second partial flow of the exhaust gas is directed to the second branch of the flow junction. In this context, positions which customary exhaust gas bypass valves, which only have a flow switching function, assume, if appropriate for a short time, during the switching over between these two positions must be less than a fixed operating position.

If the possibility of correspondingly already setting the temperature of the stored fluid at the outlet from the heat exchanger is not available or the controller does not permit any sufficiently fine adjustment and/or if this is desirable for other reasons, one embodiment of the method provides for the temperature of the stored fluid to be reduced before the inlet into the stored fluid expansion machine. This is done, for example, in that nonheated stored fluid and/or a fluid mass flow, in particular a water mass flow, is added downstream of the heat exchanger and upstream of the expansion machine to the heated stored fluid which flows out of the heat exchanger. The addition of a fluid has the advantage here that owing to the heat of evaporation particularly efficient cooling is achieved and that the cooling process does not require any stored fluid which is compressed in a costly fashion. In contrast, the use of nonheated stored fluid has the advantage that it is not necessary to store or supply any fluid. In order to carry out this method variant, the pressure accumulator plant comprises a means for reducing the temperature of the heated stored fluid which is arranged in the flow path from the heat-receiving side of the heat exchanger to the expansion machine and which comprises, for example, a means for introducing nonheated stored fluid and/or a means for introducing fluid into the heated stored fluid; and a cooler would also be possible in this context but would involve considerable expenditure on equipment.

As has already been indicated, a setpoint temperature of the stored fluid which flows to the expansion machine is determined as a function of the thermal state of the expansion machine in one method variant.

Further developments of the method according to the invention and of the pressure accumulator plant emerge from the exemplary embodiments illustrated below.

The pressure accumulator plant for carrying out an exemplary method is controlled by using, for example, a control unit which has at least one signal output and preferably a plurality of signal outputs and signal inputs, with at least one signal output directing an actuation signal to an actuator element of the pressure accumulator plant, as a result of which the pressure accumulator plant is made to carry out a method described above. To do this, the control unit generates, for example, a sequence of control signals or control signals are generated in accordance with a temporal flowchart. If the controller is operated within a closed-loop control circuit, the control unit forms the control signals as a function of at least one input signal which is applied to a signal input. In order to fulfill these tasks, the control unit must be correspondingly configured. The configuration of the control unit, for example for the purpose of defining a functional relationship for forming manipulated variables from input variables, is done, for example, by means of a processor which has loaded into it a digital program which is suitable for configuring the control unit in such a way that it causes a pressure accumulator plant to carry out a method as described above. To this extent, the invention also comprises a control unit which is configured to cause a pressure accumulator plant to carry out a method as described above, a digital code which is suitable for configuring a control unit in such a way that it causes the pressure accumulator plant to carry out the method, and a data carrier on which such a digital code is stored as an executable sequence of instructions or as a source code. A data carrier is to be understood as including nonvolatile memory modules as well as the possible examples of magnetic or optical data carriers. This also includes memory modules or correspondingly configured programmable logic modules which are installed directly in the control unit. Of course, the enumeration of the data carriers is not exhaustive.

BRIEF DESCRIPTION OF THE DRAWINGS

The invention will be explained in more detail below with reference to exemplary embodiments illustrated in the drawing. In particular.

For understanding of the invention nonessential details have been omitted but are also disclosed in a way which is readily implicit to a person skilled in the art. The exemplary embodiments are purely instructive and are not intended to be used to restrict the invention characterized in the claims.

DETAILED DESCRIPTION

Figure 1:
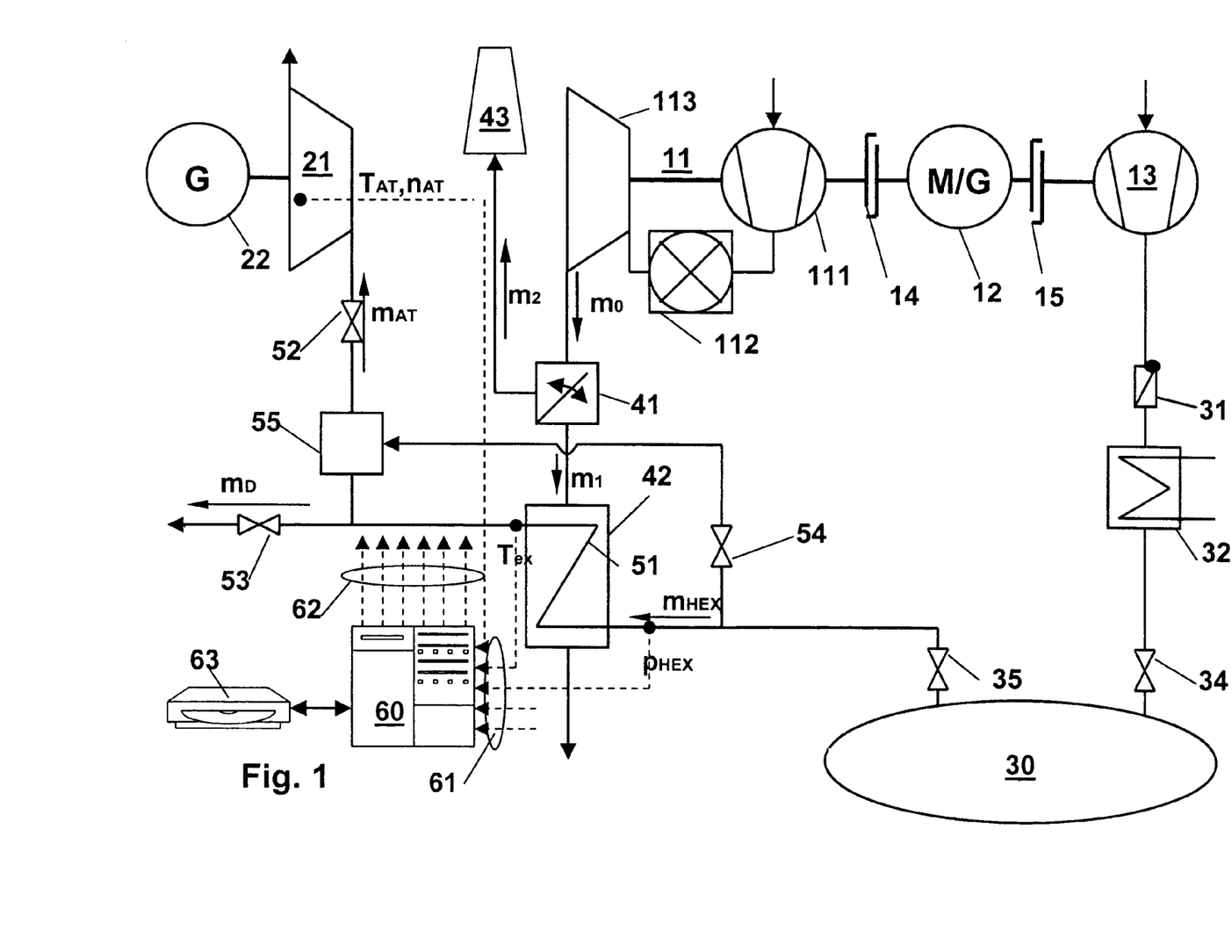
FIG. 1 shows a first example of a pressure accumulator plant.

FIG. 1 illustrates a first pressure accumulator plant which is suitable for carrying out a method described above. The pressure accumulator plant comprises essentially a gas turbine set 11 which is arranged with a motor/generator unit 12 and a compressor 13 on a common power train. The motor/generator unit 12 can be operated either in a motor mode or in a generator mode. The compressor 13 serves to charge a pressure accumulator volume 30. Working fluid which is stored therein can be expanded at times of high electrical power demand in a way which performs work in the stored fluid expansion machine, air turbine 21, which drives the generator 22. The air turbine used here is in particular a steam turbine which is available on a standard basis, as it were ex warehouse, and which only has to be modified slightly. This results in a particularly economical solution. The electric machine 12 can be connected to the gas turbine set 11 and/or to the compressor 13 by means of switchable clutches 14, 15. At times of high power demand and in order to start the gas turbine set, the clutch 14 is closed and the clutch 15 opened. In order to start up the gas turbine set, the electric machine 12 is operated electromotively and supports the acceleration of the gas turbine set to the rated rotational speed. In order to generate the power, the electric machine 12 is operated in generator mode and driven by the gas turbine set 11. At times of high availability of electrical energy, accompanied by a correspondingly low electricity price, the clutch 15 is closed and the clutch 14 opened. The machine 12 is operated by electric motor and drives the compressor 13 in order to be able to use cheaply available current to charge the storage volume 30 with pressurized fluid, for example air, and to be able to use the stored energy in the expansion machine 21 at times of high electrical power demands and correspondingly high electricity prices to generate electric power again. The gas turbine set 11 is during this time usually in a stationary state, but it is in theory also possible to keep the gas turbine set 11 ready in the idling mode. Furthermore, an operating state in which both clutches 14 and 15 are closed is possible, and in this context, depending on the power configuration of the components, either the gas turbine set 11 and the electric machine 12 drive the compressor together, or the gas turbine set 11 is operated in order, on the one hand, to drive the electric machine 12 to generate power and at the same time the compressor 13. In this context, for example the excitation of the machine 12 which is operated in generator mode determines the division of the power of the gas turbine set between the compressor 13 and the machine 12. The possibility, which is thus made available, of setting the useful power and the reactive power independently of one another by variable excitation of the generator and variable compressor power is likewise very lucrative in liberalized electric power markets. It is also possible to open both clutches 14 and 15 and allow the electric machine 12 to rotate along without load and without drive as a phase shifter in the electric power network in order to make available the necessary reactive power components. It is likewise possible, in a way which is not illustrated but with which a person skilled in the art is readily familiar, also to arrange the air turbine or expansion machine on a common power train with a compressor and an electric machine which can be operated either in generator mode or electric motor mode. In a way which is analogous with the power train of the gas turbine set, switching clutches are then arranged between the expansion machine and the electric machine as well as between the compressor and the electric machine. The compressor is likewise switched in such a way that it feeds stored fluid into the storage volume 30. In the process, the compressor on the power train of the expansion machine can be connected either in parallel or in series with the compressor on the power train of the gas turbine set. Dividing the entire compressor power in this way between two compressors permits high compressor power levels without having to arrange extremely long compressor power trains which are difficult to deal with dynamically; even though an arrangement of two compressors initially seems more costly than arranging just one compressor, the division of the compressor power starting from a certain power variable permits compressors which are available on a standard basis to be used without having to carry out difficult redesign measures for the rotor dynamics. The operation of a compressor and expansion machine as well as the switched states of the switching clutches are clear in themselves to a person skilled in the art from the statements relating to the power train of the gas turbine set. In the charging mode of the pressure accumulator plant, the shutoff element 34 is opened, and the shutoff and/or actuator element 35 is usually closed. Fluid which is compressed by the compressor 13 is cooled in a cooler 32 and flows into the storage volume 30 through the opened shutoff element 34. Furthermore, in this flow path a nonreturn element 31 is arranged which reliably prevents fluid from flowing back into the compressor. In the power mode of the pressure accumulator plant, the gas turbine set 11, which comprises a compressor 111, a combustion chamber 112 and a turbine 113, generates an exhaust gas mass flow $m_0$. The exhaust gas mass flow $m_0$ flows into a flow branching element 41 in which a controllable exhaust gas damper is arranged. By means of the damper which is arranged at the junction 41 it is possible to divide the exhaust gas mass flow $m_0$ into a first partial flow $m_1$ and a second partial flow $m_2$. The first partial flow flows into a heat exchanger 42 through which stored fluid from the storage volume 30 can flow in a heat-receiving part in counterflow with respect to the exhaust gas. In this way, the stored fluid can be heated and the waste heat of the gas turbine set can be converted in the air turbine 21. The second partial flow flows away via a stack 43. For the sake of good utilization of energy it is of course desirable to keep the second partial flow, which flows away without the waste heat being used, as small as possible. It is clear to this extent that one of the partial flows can readily become zero. While the first partial flow of the exhaust gas of the gas turbine set flows through a heat-emitting part of the heat exchanger 42, a heat-receiving part 51 of the heat exchanger can have stored fluid applied to it from the storage volume 30 via the actuator and/or shutoff element 35, which is also referred to as a wellhead. The mass flow of the stored fluid which flows to the heat-receiving part 51 of the heat exchanger is designated by $m_{HEX}$. The stored fluid is directed downstream of the heat exchanger to the expansion machine 21 via an actuator element 52. Furthermore, a mixer 55 is arranged in the flow path of the stored fluid downstream of the heat exchanger. Nonheated stored fluid can be fed to the mixer 55 via a bypass line of the heat exchanger. As a result, the temperature of the stored fluid flowing to the expansion machine 21 can be reduced in the mixer 55. Furthermore, a blowoff element, bypass valve 53, is arranged downstream of the heat-receiving part of the heat exchanger, via which blowoff element 53 it is possible to discard a blowoff mass flow or bypass mass flow $m_D$ of the stored fluid, after it has flowed through the heat-receiving part 51 of the heat exchanger by, for example in the case of air as the stored fluid, discharging it or cooling it again and feeding it back into the storage volume 30 by means of a compressor. In order to perform open-loop and closed-loop control of the storage plant, a control unit 60 is arranged. The control unit comprises an input interface which obtains a large number of input signals 61 which characterize the operating state of different components of the storage plant. The control unit 60 is configured in such a way that it forms, from the input signals 61, control signals 62 which are passed on via an output interface to actuator elements of the storage plant. These include, for example, manipulated variables for actuating the shutoff and/or actuator elements 34, 35, 52, 53 and 54 or for the exhaust gas damper in the flow junction 41. The control unit 60 is configured, for example, by means of a processor (not illustrated) which is correspondingly configured by a digital code. This digital code is stored in a data carrier 63 and is loaded into the control unit when the control unit starts, for example. The data carrier can, as illustrated, be an external storage medium, but a nonvolatile memory module or some other suitable storage medium may also be used as data carrier. In the power mode of the storage plant, the hot exhaust gas mass flow from the gas turbine set flows through the heat exchanger 42 and its temperature can reach, for example, values of 550 to 580° C. or 600° C., and differences from these values being also easily possible. The mass flow through the heat-receiving part 51 of the heat exchanger 42 is dimensioned in such a way that the temperature $T_{ex}$ at the outlet from the heat exchanger does not exceed a permissible maximum value. This ensures that overheating of the heat exchanger equipment is avoided. The controllable junction 41 permits here the gas turbine set to be operated even if no stored fluid is available. The entire exhaust gas mass flow is then discharged via the stack 43, bypassing the heat exchanger. A constant pressure $p_{HEX}$ of, for example, 60 bar in the heat-receiving part of the heat exchanger is set by means of the shutoff and/or actuator element 35, also referred to as "wellhead", and of course variable pressures can also be set in such a way that a sliding pressure mode is implemented. During the operation of the expansion machine 21, the mass flow is set in such a way that the temperature of the stored fluid at the outlet from the heat exchanger corresponds to a setpoint value and is, for example, 30° C. or 50° C. below the temperature of the exhaust gas of the gas turbine set. This permits the stored fluid to be utilized in the best possible way because a maximum mass specific enthalpy gradient is set across the expansion machine 21. When there is a cold start of the storage plant it is then possible that the stored fluid expansion machine will not be able to accept the mass flow, necessary for the heat exchanger, at the existing temperature. If, for example, a derivative of a steam turbine which has no heat protection shield, in particular on the rotor, and no cooling possibility is used as the expansion machine 21, it can only be heated up slowly and/or can only be accelerated to the rated rotational speed to avoid the permissible stresses in the rotor being exceeded, which could otherwise lead to serious mechanical damage. It is known, for example, to start up steam turbines with controlled stress. In this context, mechanical stresses in the rotor are determined and the acceleration to the rated rotational speed is carried out more slowly the greater the stresses. This is known as stress-controlled starting up. Further limiting factors on the application of heated stored fluid to the expansion machine may be, for example, temperature gradients at the inlet flange of the housing. A further limitation arises from the temperature or a temperature gradient at the outlet from the expansion machine. This region is generally provided for low temperatures which are, for example, below 100° C. and lower. At low rotational speeds, the temperature of the stored fluid which flows through the expansion machine drops but owing to the stage kinematics the drop is only small such that even if the temperature at the inlet of the expansion machine is in a permissible scope the permissible temperature at the outlet of the expansion machine may be exceeded. Even at low power levels, or in the idling mode at the rated rotational speed, this effect can occur owing to the low mass flow and the associated low pressure ratio of the expansion machine. Therefore, at least one temperature $T_{AT}$ of the expansion machine, for example a housing temperature and/or a fluid temperature and/or a rotor temperature at the inlet and/or at the outlet of the expansion machine and/or some other suitable temperature of the expansion machine, and the rotational speed $n_{AT}$ of the rotor of the expansion machine is measured and evaluated in the control unit 60. The control unit generates a manipulated variable for the actuator element 52. The actuator element 52 adjusts the mass flow $m_{AT}$ of the expansion machine in such a way that permissible temperature and/or rotational speed gradients are not exceeded. That is to say during the starting process of the expansion machine 21 only a limited waste heat power of the gas turbine set can be utilized. Generally, the gas turbine set can be placed at a high power output level only very slowly, and in this way the exhaust gas mass flow $m_O$ and the temperature of the exhaust gas can only be increased slowly. Apart from restrictions in this respect which the operating regime of the gas turbine set 11 may involve, this means that overall in the case of a cold start the power from the storage plant can only be delivered into the power network after a long delay. The ability to supply power quickly to the power network constitutes, however, a significant competitive advantage in today's liberalized electricity markets. A further possibility is to load the gas turbine set with its maximum power gradient while the actuator element 52 of the expansion machine 21 is controlled in accordance with the criteria specified above in such a way that the expansion machine is not overloaded and is started up with its normal rotational speed and power gradient which is significantly lower in the case of a cold start. However, if a high exhaust gas mass flow is applied comparatively quickly to the heat exchanger 42 owing to the fast starting up and loading of the gas turbine set, the stored fluid mass flow must also be increased very quickly in order to avoid overheating of the heat exchanger equipment. This means that at the outlet from the heat-receiving part 51 of the heat exchanger both the mass flow and the temperature are increased more quickly than the expansion machine is capable of processing. Therefore, during a starting process which occurs in such a way and during which a maximum thermal power is already applied to the heat exchanger 42 very quickly, for example within 20 or 30 minutes after the synchronization or after the firing of the gas turbine set, on the one hand the actuator element 54 is opened in order to direct nonheated stored fluid to the mixer 55, thus lowering the temperature of the stored fluid at the inlet into the expansion machine to a value below the temperature of the stored fluid at the outlet from the heat exchanger and adjusting to a value which is compatible with the operating state of the expansion machine. A portion of the overall mass flow $m_{HEX}$ which exceeds the mass flow $m_{AT}$ which can be utilized by the expansion machine while maintaining the permissible rotational speed and temperature gradients is blown off as a blowoff mass flow $m_D$ via the actuator element 53. The actuator element 53 makes it possible to ensure a minimum necessary flow through the heat-receiving part 51 of the heat exchanger 42 at all times, even when the actuator element 52 is completely closed. Although this method permits power to be produced quickly by means of the gas turbine set, it is unfavorable economically insofar as a considerable mass flow of stored fluid which has previously been compressed in a costly fashion has to be discarded unused via the blowoff element 53, in particular in the case of a cold start. The junction 41 is therefore provided with a damper in order to deflect the flow, which damper permits the current to be divided in a variable fashion between the two outflow openings of the junction in such a way that variable portions of the entire exhaust gas mass flow $m_O$ can be directed to the heat exchanger and to a second branch of the junction, that is to say to the stack in this case. The damper of the junction is therefore embodied in such a way that in addition to a first fixed operating position in which the entire exhaust gas mass flow is directed into the heat exchanger, and a second fixed operating position in which the entire exhaust gas mass flow is directed into the stack, it has at least a third fixed operating position in which a first partial flow of the exhaust gas is directed to the heat exchanger and a second partial flow is directed into the stack. Such an arrangement makes it possible to adapt the thermal power which is applied to the heat exchanger better to the thermal power which can be utilized by the expansion machine. In this way the unproductively discarded blowoff mass flow $m_D$ can be reduced. Ideally, the damper within the junction 41 is continuously adjustable, but in practice this is comparatively difficult to implement, for which reason junctions in which the damper has discrete intermediate positions for the fixed operation are also used. Per se it is also possible, if also less energy efficient, to dispense with the junction 41 and/or with the intermediate positions. However, in this case significantly more stored fluid has to be discarded unused via the blowoff element 53, said fluid being required to conduct heat away from the heat exchanger but not being recyclable in the expansion machine during the starting process. The blowoff element is also useful if an existing exhaust gas damper, as illustrated in the Figure, is nonoperational, so that the operating mode of the storage plant in which the gas turbine set can be operated independently of the thermal state of the expansion machine can continue to be made possible. Furthermore, the blowoff element serves during any trip of the expansion machine to relieve the loading of the expansion machine and permits the residual heat from the heat exchanger to be discharged and/or the gas turbine set to continue to be operated without restriction. In the way already described above it is possible, insofar as the mass flow limitation and temperature limitation of the stored fluid are not predefined by the states at the inlet to the expansion machine, to speed up the starting of the expansion machine by supporting the increase in rotational speed of the expansion machine by the generator which is driven in the electric motor mode. In this way, on the one hand the mass flow of stored fluid which the expansion machine can utilize rises more quickly. That is to say less energy in the form of stored fluid which is discarded via the blowoff element 53 and in the form of exhaust gas from the gas turbine set which is directed unused through the stack has to be discarded. The starting process thus becomes even more energy efficient. Furthermore, the expansion machine 21 is capable of delivering power quickly into the electric power network, which also provides a significant advantage. The generator 22 of the expansion machine 21 is therefore provided on its electric side with a starting aid device. Such starting devices are known per se from the generators of gas turbine sets and the drive motors of compressors. The electric machine 12 is provided with such a starting device which is, however, known per se to a person skilled in the art in this context and is therefore not illustrated explicitly in the Figure. While gas turbine sets require such a starting device for their compressor to be placed at a rotational speed which ensures a minimum mass flow which is necessary to fire the combustion chamber, steam turbines and air turbines are usually started up by applying working fluid to the machines; an external starting device is not necessary per se. The generator 22 of the expansion machine 21 is connected to the electric power network in a manner known per se via a transformer 71 and a power network switch 73. For reasons of clarity, instead of the customary three phases of the three phase power network only a schematic profile is shown. Between the transformer 71 and the generator 22, the power supply has two branches which can be selected by means of switches 74 and 75. In the power mode of the expansion machine, the switches 73 and 75 are closed and the switch 74 is opened, and the generator 22 feeds electric power into the power network 70. When the expansion machine is started up, the switches 73 and 74 are closed and the switch 75 is opened. The generator 22 is then operated in electric motor mode and asynchronously with respect to the power network. In this context, the frequency converter 72, for example what is referred to as a static frequency converter SFC, converts the alternating current frequency of the power network in a way with which a person skilled in the art is familiar per se such that it can be utilized by the generator which is operated non synchronously in the electric motor mode. In this way the acceleration of the expansion machine can be supported, avoiding the problems of an excessive rise in the temperature at the outlet of the expansion machine at low rotational speeds and increasing at the same time the starting gradient of the expansion machine. In total, the expansion machine can thus be accelerated more quickly to the rated rotational speed and the generator 22 can be operated in the power mode on the power network as would be possible if the expansion machine were accelerated only by the power of the through-flowing stored fluid.

Figure 2:
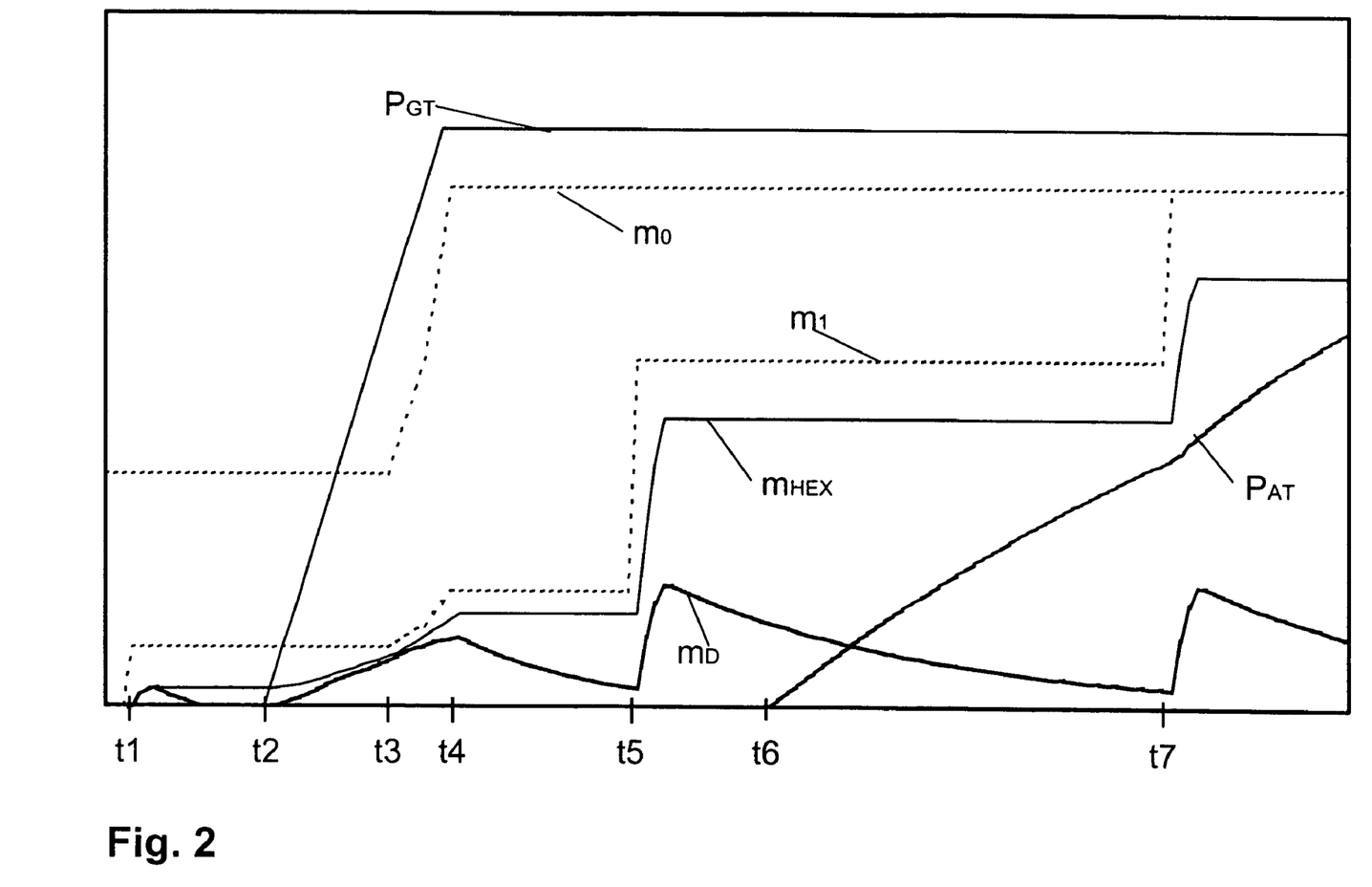
FIG. 2 shows the schematic profile of a number of operating parameters of the pressure accumulator plant during a starting process.

In conjunction with FIG. 2, an explanation will now be given of the starting process of the storage plant from FIG. 1 in which the exhaust gas damper of the junction 41 has two discrete fixed intermediate positions in addition to the positions in which the entire mass flow is directed either to the stack or to the heat exchanger. In FIG. 2, the profile of various mass flows and of the power $P_{GT}$ of the gas turbine set and $P_{AT}$ of the expansion machine is plotted over time. It is to be noted here that the illustration is not to scale but rather only different profiles are illustrated qualitatively in order to facilitate understanding of the starting process. In particular, the illustration in FIG. 2 serves to show how the exhaust gas mass flow $m_D$ is minimized, and at the same time the loading speed is maximized, by means of the exemplary starting process and the exemplary storage plant. In a first phase of the starting process which is not illustrated in the diagram and which, as it were, adjoins to the left of the illustration, the gas turbine set is fired and accelerated to the rated rotational speed. In this context, the damper of the junction 41 is set in such a way that the entire exhaust gas mass flow $m_0$ of the gas turbine set is directed past the heat exchanger 42. The damper is placed in a first position at the time t1 such that a first partial flow m1 of the exhaust gas mass flow $m_0$ is directed into the heat exchanger. The closed-loop flow control of the heat exchanger reacts to the application of hot exhaust gases with a delay which is caused by thermal inertia of the heat exchanger. The actuator element 53 is opened and the flow through the heat-receiving part 51 of the heat exchanger is adjusted in such a way that overheating of the heat exchanger is avoided. As a result, the mass flow $m_D$ firstly rises. As early as possible, the mass flow $m_{AT}$ (not illustrated) is increased in order to start the heating process of the expansion machine, and the mass flow $m_D$ is correspondingly lowered. At the time t2, the gas turbine set is synchronized and its power is increased with a normal power gradient. A gas turbine set which is not specially configured for peak load reaches its maximum power typically within approximately 20 minutes up to half an hour after the synchronization process, with differences from these exemplary time details being readily possible. In the illustrated example, the gas turbine set has reached its maximum power at the time t4 and stays there; in the illustrated device and the method explained here it is, however, readily possible to operate the gas turbine set as desired in accordance with the power requirements of the power network, independently of the other starting process. As the power of the gas turbine set rises, its exhaust gas temperature and thus the thermal power to be converted in the heat exchanger also rise. For this reason, after the synchronization process the stored fluid mass flow $m_{HEX}$ in the heat exchanger rises. Because this rising mass flow and the rising temperature cannot be processed directly by the expansion machine, the blowoff mass flow $m_D$ also rises. In the time period between t3 and t4, a row of adjustable inlet guide vanes of the compressor of the gas turbine set is opened, for which reason the exhaust gas mass flow $m_0$ and, given the constant position of the exhaust gas damper in the distributor 41, the mass flow $m_1$ in the heat-emitting part of the heat exchanger 42 rise. This results in an increased rise in the stored fluid mass flow $m_{HEX}$ through the heat exchanger. During this time, the expansion machine 21 is heated up again and is therefore able to process a relatively large mass flow. At the same time, the temperature of the stored fluid which flows into the expansion machine can be lowered by adding to the stored fluid in the mixer 55 a nonheated stored fluid mass flow which is dimensioned by means of the actuator element 54. For this reason, the mass flow which can be utilized by the expansion machine increases, and the blowoff mass flow $m_D$ does not completely undergo the rise in the stored fluid mass flow $m_{HEX}$ because the expansion machine is able to utilize increasingly large mass flows. As has already been explained repeatedly, the mass flow of the expansion machine can additionally be increased more quickly if the expansion machine is started up with support from the generator operated in electric motor mode, and is accelerated to the rated rotational speed. After the maximum power of the gas turbine set has been reached, an initially constant value is set for the entire stored fluid mass flow $m_{HEX}$. The blowoff mass flow decreases continuously. If the blowoff mass flow $m_D$ drops below a limiting value, the damper in the distributor 41 is set to a second intermediate position at the time t5. With this step it is in principle also possible to wait until the blowoff mass flow has returned to zero; but in the interest of a fast power output this step already takes place in the exemplary embodiment when the blowoff mass flow has dropped below a limiting value. The partial flow $m_1$ of the total exhaust gas mass flow which flows to the heat exchanger increases. Correspondingly, the stored fluid mass flow $m_{HEX}$ increases, which increase is delayed by the thermal inertia of the heat exchanger. Owing to the sudden increase in the thermal power to be converted, the blowoff mass flow $m_D$ also increases at first before decreasing again afterwards as the stored fluid expansion machine progressively heats up. At the time t7 the exhaust gas damper in the junction is placed in a position in which the entire exhaust gas mass flow of the gas turbine set flows through the heat exchanger. This results in the stored fluid mass flow $m_{HEX}$ and the blowoff mass flow $m_D$ rising once more, the latter returning to zero in a way which is not illustrated but is clear to a person skilled in the art, as the storage plant progressively heats up. At the time t6, the stored fluid expansion machine is synchronized and its power $P_{AT}$ is increased. The stored fluid expansion machine essentially reaches its maximum power output approximately when the blowoff mass flow $m_D$ has returned to zero. The loss of stored fluid which is necessary for technical operating reasons results from the integral under the profile curve of the blowoff mass flow. The latter is, of course, smaller the faster the stored fluid expansion machine is able to process a high mass flow of stored fluid at a high temperature. Furthermore, this loss is lower the more fixed intermediate positions the exhaust gas damper in the distributor 41 has, that is to say the smaller the increments in mass flow in the heat-emitting part of the heat exchanger. In the case of a continuously adjustable exhaust gas damper, these losses can be reduced as far as zero or at least as far as close to zero. The loss of stored fluid can, as described above, be reduced further by reducing the temperature of the stored fluid which flows into the stored fluid expansion machine in the mixer 55 and adapting it to a temperature which is compatible with the operating state of the stored fluid expansion machine. Likewise, the starting assistance provided to the expansion machine by the generator which is operated in electric motor mode can reduce this loss further.

Figure 3:
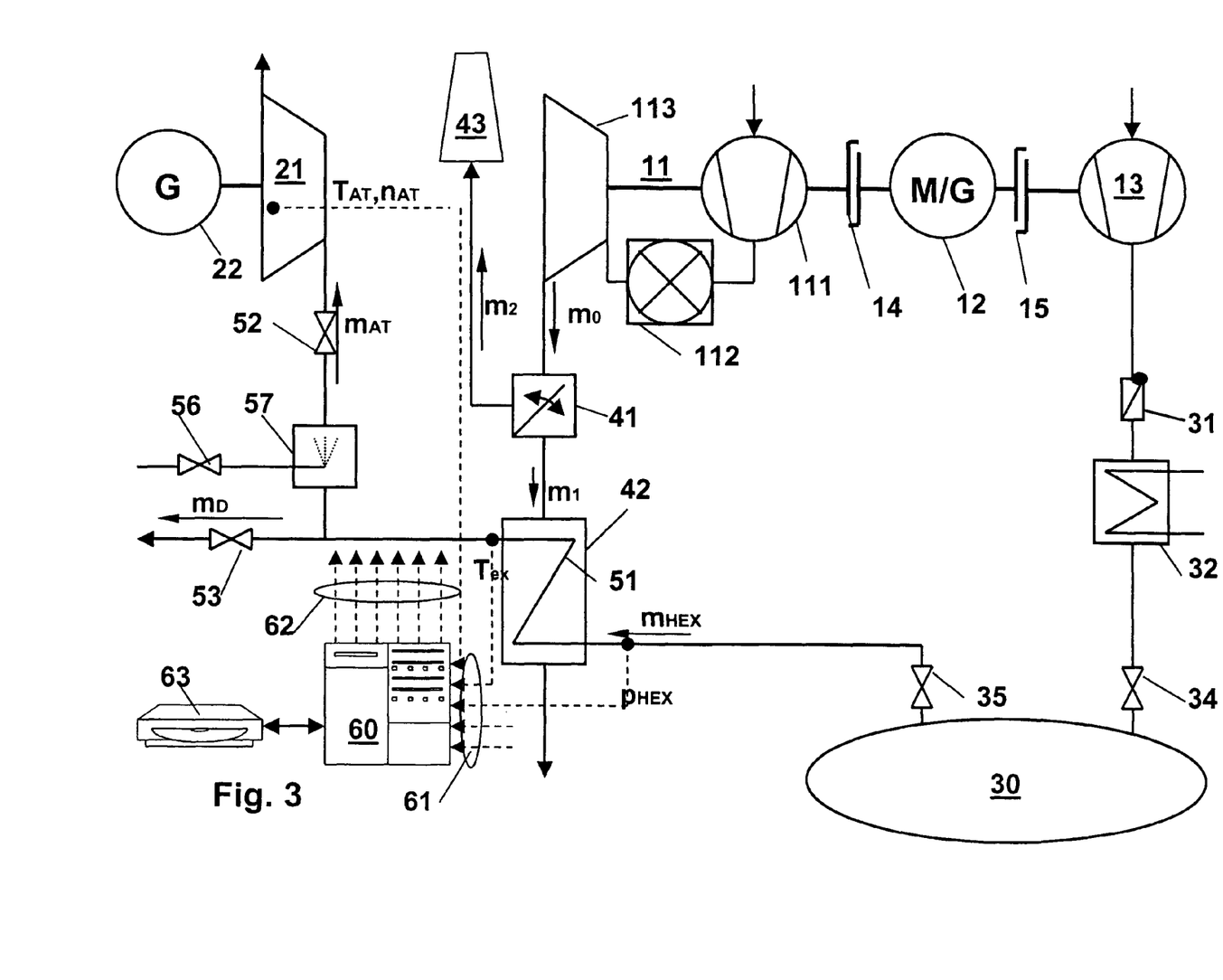
FIG. 3 shows a second example of a pressure accumulator plant.

FIG. 3 illustrates a further embodiment of the pressure accumulator plant. This differs from the pressure accumulator plant illustrated in FIG. 1 in that, instead of the mixer 55, an injection cooler 57 is arranged, to which a liquid mass flow is apportioned via an actuator element 56, said liquid mass flow being injected by nozzles into the stored fluid in the injection cooler. Owing to the vaporization of the liquid, the stored fluid flowing into the stored fluid expansion machine cools. In this way it is likewise possible to lower the temperature in such a way that the stored fluid expansion machine can utilize a larger proportion of the stored fluid which is passed through the heat exchanger. In this embodiment, it is advantageous compared to FIG. 1 that in order to cool the stored fluid it is not necessary to use additional stored fluid; the price paid for this is that liquid has to be stored or demineralized and cleaned liquid made available. In a way analogous to the statements made with respect to FIG. 1, it is also possible to arrange a further compressor on the power train of the expansion machine here; detailed explanations are not necessary in light of the statements made there.

In light of these statements, a person skilled in the art is provided with a large number of further embodiments which are included within the scope of the invention. The exemplary embodiments which are illustrated in order to explain the invention may, of course, not be conclusive in this context. As already indicated above, it is in principle possible to dispense with the adjustable exhaust gas damper even if this causes efficiency losses during starting because more stored fluid has to be passed through the heat exchanger during the starting process of the expansion machine, in which case the entire mass flow cannot be utilized by the expansion machine, which means that stored fluid has to be discarded unused via the blowoff element. In particular, it is also possible to use a gas turbine set with sequential combustion, such as has been disclosed by EP 620 362. It is possible, for example, for two or more gas turbine sets to act on a common heat exchanger. Furthermore, the charging compressor 13 can be arranged on a separate power train with a drive machine and furthermore a plurality of compressors connected in series are generally used here, but this is not illustrated because it is not essential to the invention. Embodiments of the invention which go beyond these examples are of course also included.

LIST OF REFERENCE SYMBOLS

11 Gas turbine set
12 Motor generator unit, electric machine
13 Compressor
14 Clutch
15 Clutch
21 Stored fluid expansion machine; air turbine
22 Generator
30 Storage volume
31 Nonreturn element
32 Cooler
34 Shutoff element
35 Shutoff and/or actuator element; "wellhead"
41 Flow branching element; junction with exhaust gas damper
42 Heat exchanger
43 Stack
51 Heat-receiving part of the heat exchanger
52 Actuator element, control valve
53 Actuator element, bypass valve
54 Actuator element, mixing valve
55 Mixer
56 Actuator element
57 Injection cooler
60 Control unit
61 Input signals of the control unit
62 Output signals of the control unit, control variables
63 Data carrier
70 Electric power network
71 Power network transformer
72 Frequency converter
73 Power network switch
74 Starter switch
75 Power switch
111 Compressor of the gas turbine set
112 Combustion chamber
113 Turbine of the gas turbine set
$n_{AT}$ Rotational speed of the expansion machine
$m_0$ Exhaust gas mass flow
$m_1$ First partial flow of the exhaust gas mass flow
$m_2$ Second partial flow of the exhaust gas mass flow
$m_{AT}$ Mass flow of the expansion machine
$m_D$ Blowoff mass flow, bypass mass flow
$m_{HEX}$ Stored fluid mass flow through the heat exchanger
$p_{HEX}$ Pressure of the stored fluid in the heat exchanger
$P_{GT}$ Power output of the gas turbine set
$P_{AT}$ Power output of the expansion machine
$T_{AT}$ Temperature of the expansion machine
$T_{ex}$ Temperature of the stored fluid downstream of heat exchanger

What is claimed is:

1. A method for operating a pressure accumulator plant, wherein the pressure accumulator plant comprises: a gas turbine set, a storage volume for a stored fluid which is under pressure, a stored fluid expansion machine, and a heat exchanger through which exhaust gas from the gas turbine set can flow on a heat-emitting side and whose heat-receiving side is arranged in a flow path from the storage volume to the expansion machine, and which method comprises:
 placing the gas turbine set at an operational speed;
 synchronizing a generator of the gas turbine set with an electric power network and operating the gas turbine set to output power into the electric power network; and
 applying stored fluid and exhaust gas from the gas turbine set to the heat exchanger and making available heated stored fluid for the stored fluid expansion machine,
 wherein the temperature of the stored fluid which is made available for the expansion machine is controlled independently of the power output of the gas turbine set, but as a function of the thermal state of the expansion machine.

2. The method as claimed in claim 1, wherein the temperature of the stored fluid which is made available for the expansion machine is controlled in such a way that the temperature and/or the temperature gradient of the expanded stored fluid at the outlet of the expansion machine remains below a limiting value.

3. The method as claimed in claim 1, wherein the temperature of the stored fluid which is made available for the expansion machine is controlled in such a way that the temperature gradient of the rotor temperature and/or the housing temperature at the outlet of the expansion machine remains below a limiting value.

4. The method as claimed in claim 1, wherein the expansion machine is accelerated to the rated rotational speed and the acceleration of the expansion machine is supported by operating a generator assigned to the expansion machine in a motor mode.

5. The method as claimed in claim 1, wherein at first a stored fluid mass flow is fed to the expansion machine when the temperature of the stored fluid at the outlet from the heat exchanger has reached a minimum value.

6. The method as claimed in claim 1, wherein a first stored fluid mass flow is fed to the expansion machine essentially directly after the synchronization of the gas turbine set.

7. The method as claimed in claim 1, wherein the temperature of the stored fluid is controlled at the outlet from the heat exchanger.

8. The method as claimed in claim 7, wherein a stored fluid mass flow is directed through the heat-receiving side of the heat exchanger and the stored fluid mass flow is set in such a way that the temperature at the outlet from the heat exchanger reaches a setpoint value, comprising directing a first partial mass flow, which can be used by the stored fluid expansion machine, to the expansion machine and directing a second mass flow, which exceeds the first partial mass flow, past the stored fluid expansion machine.

9. The method as claimed in claim 8, comprising operating the actuator element for the first partial mass flow as an actuator element for performing closed-loop control of at least one operational variable of the expansion machine, and operating the actuator element for the second partial mass flow as an actuator element for performing closed-loop control of the temperature at the outlet from the heat exchanger.

10. The method as claimed in claim 1, wherein the input of heat into the heat exchanger is varied.

11. The method as claimed in claim 10, wherein a variable proportion of the exhaust gas mass flow of the gas turbine set is fed to the heat exchanger.

12. The method as claimed in claim 1, wherein the temperature of the stored fluid is reduced before it passes into the stored fluid expansion machine.

13. The method as claimed in claim 12, wherein nonheated stored fluid is added to the heated stored fluid downstream of the heat exchanger and upstream of the expansion machine.

14. The method as claimed in claim 12, wherein a liquid mass flow, in particular a water mass flow, is introduced into the heated stored fluid downstream of the heat exchanger and upstream of the expansion machine.

15. The method as claimed in claim 1, wherein a setpoint temperature of the stored fluid which flows to the expansion machine is determined as a function of the thermal state of the expansion machine.

16. The method as claimed in claim 1, comprising directing the entire exhaust gas mass flow of the gas turbine set past the heat exchanger when the gas turbine set is started up, directing a first partial mass flow of the exhaust gas mass flow through the heat exchanger after the rated rotational speed of the gas turbine set has been reached, directing a mass flow of the stored fluid through the heat-receiving part of the heat exchanger, setting a necessary stored fluid mass flow in such a way that a permissible maximum temperature and/or a maximum permissible temperature gradient of the stored fluid at the outlet from the heat exchanger is not exceeded, directing at least a first partial flow of the stored fluid into the expansion machine, setting the first partial flow of the stored fluid in such a way that a permissible limiting value of the rotor acceleration of the expansion machine and/or a permissible limiting value of the temperature gradients of the expansion machine is not exceeded, blowing off a second partial flow of the stored fluid mass flow, which exceeds the first partial flow, downstream of the heat exchanger,
and operating the gas turbine set independently of the thermal state of the heat exchanger and of the expansion machine.

17. The method as claimed in claim 16, comprising setting the first partial mass flow of the exhaust gas mass flow in such a way that the necessary stored fluid mass flow can be received as far as possible by the stored fluid expansion machine.

18. The method as claimed in claim 16, wherein the heated stored fluid is cooled before it is introduced into the expansion machine in such a way that permissible temperature gradients are not exceeded.

19. The method as claimed in claim 1, wherein the controller is operated in a closed-loop control circuit.

20. A control unit that causes a pressure accumulator plant to carry out a method of operation, wherein the pressure accumulator plant comprises: a gas turbine set, a storage volume for a stored fluid which is under pressure, a stored fluid expansion machine, and a heat exchanger through which exhaust gas from the gas turbine set can flow on a heat-emitting side and whose heat-receiving side is arranged in a flow path from the storage volume to the expansion machine, and wherein the method comprises:
placing the gas turbine set at an operational speed; synchronizing a generator of the gas turbine set with an electric power network and operating the gas turbine set to output power into the electric power network; and
applying stored fluid and exhaust gas from the gas turbine set to the heat exchanger and making available heated stored fluid for the stored fluid expansion machine, wherein the temperature of the stored fluid which is made available for the expansion machine is controlled independently of the power output of the gas turbine set, but as a function of the thermal state of the expansion machine.

21. A data carrier on which a digital code is stored, the digital code causing a computer to execute a method for operating a pressure accumulator plant, wherein the pressure accumulator plant comprises: a gas turbine set, a storage volume for a stored fluid which is under pressure, a stored fluid expansion machine, and a heat exchanger through which exhaust gas from the gas turbine set can flow on a heat-emitting side and whose heat-receiving side is arranged in a flow path from the storage volume to the expansion machine, and which method comprises:
placing the gas turbine set at an operational speed;
synchronizing a generator of the gas turbine set with an electric power network and operating the gas turbine set to output power into the electric power network; and applying stored fluid and exhaust gas from the gas turbine set to the heat exchanger and making available heated stored fluid for the stored fluid expansion machine, wherein the temperature of the stored fluid which is made available for the expansion machine is controlled independently of the power output of the gas turbine set, but as a function of the thermal state of the expansion machine.

* * * * *